No. 893,695.  
PATENTED JULY 21, 1908.  
E. H. AMES.  
CONCRETE OR CEMENT PIPE.  
APPLICATION FILED APR. 20, 1908.
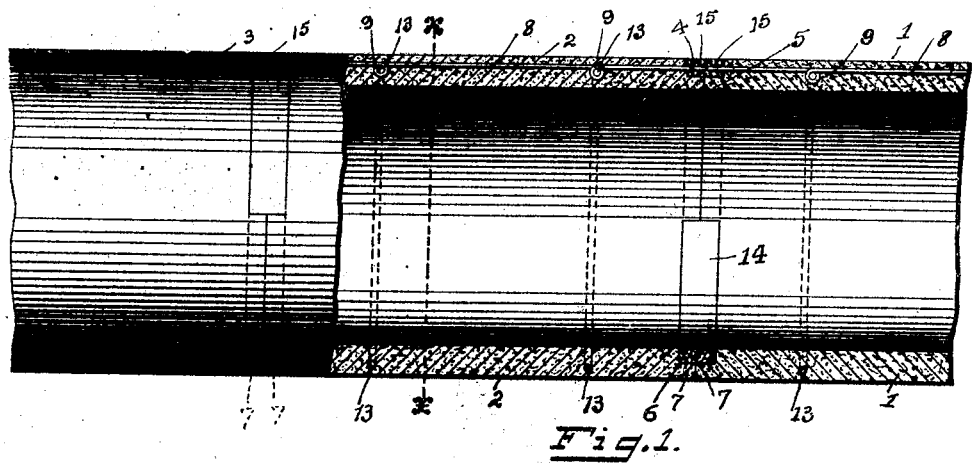
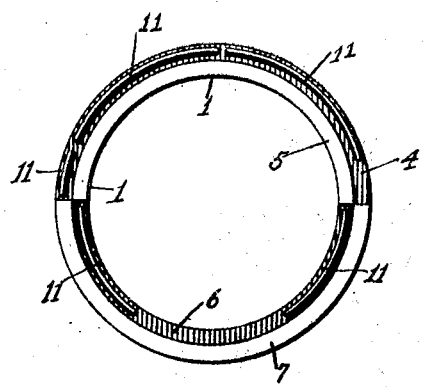
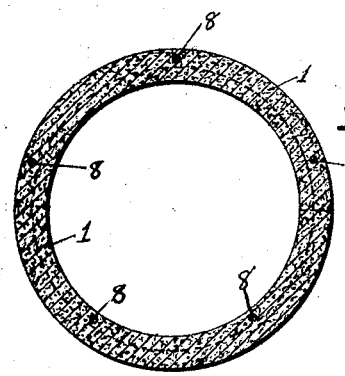
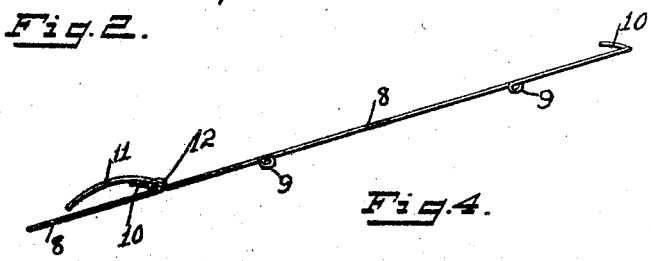
Witnesses  
Carl Stoughton  
A. L. Phelps
Inventor  
Edward H. Ames  
By C. C. Shepherd  
Attorney

UNITED STATES PATENT OFFICE.

EDWARD H. AMES, OF COLUMBUS, OHIO.

CONCRETE OR CEMENT PIPE.

No. 898,695. Specification of Letters Patent. Patented July 21, 1908.

Application filed April 23, 1908. Serial No. 428,474.

*To all whom it may concern:*

Be it known that I, EDWARD H. AMES, a citizen of the United States, residing at Columbus, in the county of Franklin and State of Ohio, have invented certain new and useful Improvements in Concrete or Cement Pipes, of which the following is a specification.

My invention relates to the improvement of concrete or cement pipes of that class which are particularly adapted for use as water or sewage conduits.

The objects of my invention are to provide an improved joint for the ends of concrete pipe sections which will result in the production of an approximately integral pipe line and which will permit of the joint or that portion of the joint below the center or spring line of the pipe being inspected from the interior of the pipe; to provide in conjunction with the above means, improvements for reinforcing the body of the pipe sections and the cement joints thereof and to produce other improvements the details of which will be more fully pointed out hereinafter. These objects I accomplish in the manner illustrated in the accompanying drawing, in which:

Figure 1 is a view partly in elevation and partly in longitudinal section of a section of pipe line having its sections joined and reinforced by my improved means, Fig. 2 is an end view of one of the pipe sections, Fig. 3 is a transverse section on line x—x of Fig. 1, and, Fig. 4 is a detail view in perspective of one of the reinforcing rods or wires showing a section of an adjoining rod connected therewith.

Similar numerals refer to similar parts throughout the several views.

1, 2 and 3 respectively represent sections of my improved concrete pipe. In the formation of the ends of each of these sections, I mold or shape the same so as to provide a peripheral recess 4 which extends from the end of the pipe a short distance inward and results in the production of an end tongue 5 of less thickness than the pipe wall. It will be observed that this peripheral recess extends only over the upper half of each pipe section or over half the circumference thereof. As indicated at 6, the remaining half of the pipe section is formed at its end with an internal recess corresponding in depth and length with the peripheral external recess 4, which results in the formation of a tongue projection 7, the periphery of which is continuous with the periphery of the body of the pipe section.

In molding each of the pipe sections I embed in the wall thereof longitudinally extending reinforcing rods or wires 8, which as indicated in Fig. 2 are arranged at suitable intervals one from the other. In the formation of each of the reinforcing rods 8, I provide the same at intervals with laterally projecting loops or eyes 9 and one end of said rod is formed with a short lateral bend or finger 10, while the remaining end thereof is formed with a longer bend or finger 11 which curves downwardly, as shown. As indicated in the drawing, the rods 8 of one pipe section are so arranged in horizontal or longitudinal alinement with the corresponding rods of the adjoining pipe section and said rods are so distributed as to result in the finger projection 11 of one section of pipe extending through the recessed portion 4 or 6 of the pipe end, while the shorter finger projection 10 of the corresponding rod of the adjoining pipe section likewise projects through the recessed end portion of its pipe section, the base or inner ends of said fingers meeting at the center of the pipe joint at which point said fingers receive a coupling ring 12. The loops 9 of the reinforcing rods are connected by suitable reinforcing rings or bands 13 which are also embedded in the concrete wall of the pipe section.

In joining two sections of pipe, the tongue portion 4 of the upper halves of the sections and the tongue portion 7 of the lower halves, are caused to abut against each other, as shown in Fig. 1, thus bringing the recessed portions 4 of two adjoining sections opposite each other and likewise bringing the recesses 6 of said adjoining sections one opposite the other. The joint of the lower half of the pipe sections is completed by the introduction of cement such as is indicated at 14, into the adjoining recessed portions of said lower halves, the resulting joint or filler being preferably flush with the inner surfaces of the pipe sections. In a similar manner the peripheral channel formed by the recesses 4 are filled with cement as indicated at 15, this cement joint in both the upper and lower portions of the pipe sections being made to inclose the joined end fingers of the reinforcing rods 8. In this manner, it will be observed that not only are the bodies of the pipe sections firmly cemented one to the other, but that the ends of the reinforcing rods 8 are anchored in the cement which forms the joint.

By forming the lower half of the joint from the interior of the pipe line, it will readily be understood that in comparatively large sized pipes such as are contemplated in my improvement, that portion of the joint which is ordinarily subjected to the direct action of the water or other contents of the pipe, can be readily inspected or repaired from the interior of the pipe.

From the construction herein shown and described, it will be readily seen that a simple and comparatively inexpensive concrete pipe construction and joint is provided which will result not only in the production of a substantially integral pipe line, but which will permit of the inspection and repair of the joint from the interior of said pipe line after the pipes are laid, the advantage of which will be readily understood.

What I claim, is:

1. In a pipe, the combination of separately formed concrete pipe sections, the abutting ends of the upper portions of which are externally recessed and the ends of the lower portions of which are internally recessed, and a uniting filling for said recesses.

2. In a pipe, the combination of separately formed concrete pipe sections, the abutting ends of the upper portions of which are externally recessed and the ends of the lower portions of which are internally recessed, a uniting filling for said recesses, and reinforcing rods within the walls of said pipe sections and having their ends projecting and united within said pipe section recesses and embedded within the uniting filling.

In testimony whereof I affix my signature in presence of two witnesses.

EDWARD H. AMES.

Witnesses:
L. CARL STOUGHTON,
A. L. PHELPS.